United States Patent [19]

Takehisa et al.

[11] 3,873,492

[45] Mar. 25, 1975

[54] GYPSUM COMPOSITIONS FOR GYPSUM-THERMOPLASTIC COMPOSITE

[75] Inventors: Masaaki Takehisa; Hirondo Kurihara; Toshiaki Yagi; Hiromasa Watanabe; Sueo Machi, all of Takasaki, Japan

[73] Assignee: Japan Atomic Energy Research Institute, Tokyo, Japan

[22] Filed: Nov. 22, 1972

[21] Appl. No.: 308,793

[30] Foreign Application Priority Data

Nov. 24, 1971  Japan............................... 46-93557
Nov. 24, 1971  Japan............................... 46-93558

[52] U.S. Cl............ 260/42.14, 106/111, 117/100 B
[51] Int. Cl..... C08f 45/14, C04b 11/16, B05c 7/14
[58] Field of Search................. 117/100 B; 106/111; 260/41 R

[56]  References Cited
UNITED STATES PATENTS 2,745,813   5/1956   Logemann et al................. 260/29.6
2,993,799   7/1961   Blake................................. 106/193

FOREIGN PATENTS OR APPLICATIONS 936,057   9/1963   United Kingdom.................. 260/41

Primary Examiner—Morris Liebman
Assistant Examiner—S. L. Fox
Attorney, Agent, or Firm—Browdy and Neimark

[57]  ABSTRACT

A gypsum composition having affinity for a thermoplastic resin is obtained by adhering a polysulfone resins to the surface of a gypsum powder. The composition is suitable for preparing a gypsum-thermoplastic resin composite.

11 Claims, No Drawings

GYPSUM COMPOSITIONS FOR GYPSUM-THERMOPLASTIC COMPOSITE

BACKGROUND OF THE INVENTION

1. Field of the Invention:

The present invention relates to a gypsum composition having affinity to thermoplastic resin, and a process for preparing the gypsum composition. Particularly, the invention relates to an improved gypsum composition in which affinity to thermoplastic resin is increased by improving the hydrophilic surface of a gypsum powder, which is to be used to prepare a composite having thermoplasticity by mixing the gypsum with thermoplastic resin.

2. Description of the Prior Art:

In recent years, a large quantity of gypsum is produced as a by-product in various processes for desulfurization or for trapping of sulfur dioxide, since the exhaust of oxides of sulfur to the atmosphere is judicially restricted. At present, the application of the gypsum obtained in the above processes is limited to only few kinds of materials such as gypsum board and the like, and the development of new applications for enormous quantities of the material is being required. On the other hand, the chemical industries for polymers have remarkably been developed, and various kinds of thermoplastic resins such as polyethylene and polyvinyl chloride are produced in the order of 100 million tons per year.

With the above mentioned setting, the composite of gypsum with thermoplastic resin calls the attention of the various industrial fields, and it has been known that the mixture of gypsum, having two hydrate water molecules, with polyethylene, polyvinyl chloride or the like in the presence or absence of a reasonable additive results in an excellent composite (for instance, Japanese Pat. Publication No. 29377/1971). However, gypsum is the typical material which has hydrophilic surface, and polymer plastics represented by polyethylene is the material which has a hydrophobic surface. Therefore, it has been proposed that ethylenepropylene or styrene butadiene synthetic rubber, or natural rubber be added, by 5 weight percent at most, to the above mentioned composite (for instance, Japanese Pat. Publication No. 29613/1971). Moreover, another method has been also proposed, which attempts to increase in the dispersion of inorganic material and the strength of the composite, by adding a special amphoteric surfactant comprising metallic salt in an amount of 0.5 - 5 weight percent of the used polymer, in the production of such inorganic-organic composite (for instance, Japanese Pat. Publication No. 29374/1971).

SUMMARY OF THE INVENTION

One object (A) of the present invention is to provide the gypsum composition for a composite use and its preparing process, by which a gypsum-thermoplastic resin composite with improved properties is presented by improving the surface property of the gypsum on which polysulfone is strongly sticked which has an intermediate hydrophilic property between those of gypsum and thermoplastic resin, through for example the copolymerization reaction of olefin with sulfur dioxide on the surface of the gypsum, by irradiating an ionizing radiation or by applying a radical initiator to a system comprising gypsum, sulfur dioxide and olefin; thus being prepared a mixture of gypsum having hydrophilic surface with thermoplastic resin with hydrophobic (oleophilic) surface wherein both materials are well adhered for each other.

Another object (B) of the present invention is to provide a gypsum composition for blend use for thermoplastic resin and its preparing process, which composition results in a good dispersibility even to a polyolefin which is nonpolar material and good processing characteristics of the mixture and, furthermore, improvements of the properties of the composite as final product, by treating the surface of gypsum with a solution of polysulfone resin which has an intermediate hydrophilic property between those of gypsum and thermoplastic resin; thus being prepared an excellent composite material comprising a mixture of gypsum and thermoplastic resin.

The other object of the present invention is to provide a method of improving the surface properties of a gypsum to be used for preparing the above gypsum-thermoplastic resin composite.

DESCRIPTION OF THE PREFERRED EMBODIMENT

[A]. The above object (A) of this invention is preferably performed in the following way.

The polysulfone resins herein used are those having groups shown by ($-SO_2-$) in the main chain of the polymer. While many kinds of polysulfone resins and their preparing processes have been well known, alternate copolymers comprising olefin and sulfur dioxide can preferably be used for the purpose in the present invention from the viewpoints of its properties and cost. Copolymers comprising sulfur dioxide and a vinyl compound or an allyl compound are also used. It has been known that the formation reaction of poly(olefin-sulfone) is initiated by any means such as irradiation with an ionizing radiation, irradiation with light, the application of an initiator which releases free radicals upon its decomposition such as azoisobutyronitrile, and the like, to the above mixture of the monomer. In the polymerization reaction in the presence of gypsum, irradiation with light is not so reasonable since the effective initiation of the reaction is restricted only in the surface layer of the mixture and the reaction can not be effectively initiated in the inside of the mixture. The initiation of the reaction by means of an ionizing radiation is a preferable method, since an ionizing radiation, especially x-rays, X-rays or the like, has a strong penetration power, and results in homogenous initiation of the reaction in any part of the system of the reaction mixture. Particularly, this method can effectively be applied to the formation reaction of polysulfone in which the limiting temperature of the polymerization reaction is low, since the irradiation of an ionizing radiation induces initiation of the reaction, independent of the temperature. In the process with application of radical initiator, the decomposition rate of the initiator is generally increased at higher temperature. On the other hand, the rate of the formation reaction of polysulfone is decreased when the temperature is elevated in the neighborhood of room temperature. Therefore, the effect of the initiator is reduced when once the temperature control is missed. However, this method can be industrially applied with sufficient favor when the reaction apparatus and the reaction system are reasonably selected. Incidentally, in the present invention, it is also possible to use a polymerization medium which is poor solvent for the formed poly(olefinsulfone).

Hence, in the polymerization reaction in the presence of gypsum, which is a fundamental conception of this invention, the reaction takes place on the surface of the gypsum, or the polysulfone which is formed in the neighborhood of gypsum is adhered or precipitated on the surface of the gypsum during the polymerization reaction, and very strong bonding is formed between gypsum and polysulfone. Although the study on the reasons for such strong bonding is in progress, the following is considered to be one of the reasons. That is, it is estimated that, from the general formula shown by

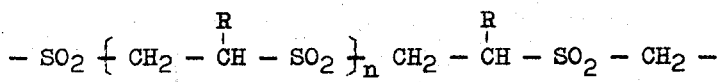

(where R means hydrogen atom, the other atom or alkyl group), this material may be physically bonded to gypsum through the $-SO_2-$ group and may be physically bonded to polymer through the $-CH_2-CHR-$ group.

It is possible to use the olefins having about 2–12 carbon atoms as a raw material for poly(olefinsulfone) in this invention, from the viewpoint of industrial obtaining and of the properties of the formed polysulfone; and particularly it is preferable to use an $\alpha$-olefin containing about 2–8 carbon atoms. However, it is also permitted to use a mixed olefin which comprises olefins containing different number of carbon atoms or non-alpha-olefins such as $\beta$-olefin. The composition of the present invention is favorably applicable to usual thermoplastic resin, preferably to polyolefins.

[B] . The above object (B) of this invention is preferably performed in the following way.

The polysulfone resins used in this invention mean those containing groups shown by $(-SO_2-)$ in the main chain of the polymer. While many sorts and the preparing methods of polysulfone resins have been well known, alternate copolymers of olefin with sulfur dioxide, or copolymers of vinyl compounds such as styrene, vinyl chloride or the like and/or allyl compounds such as allyl chloride, with sulfur dioxide, are favorably applied to the purpose of the present invention because of their properties and costs. The formation reaction of polysulfone can be initiated, by irradiation with an ionizing radiation, irradiation with light and the use of initiators such as azobisisobutyronitrile which releases free radicals through its decomposition, or by addition of silver nitrate, lithium nitrate or the like. While polysulfone resin which is produced by any initiating method can be used for the purpose in the present invention, irradiation of an ionizing radiation can favorably be used, by which the reaction rate at the initiation does not depend on temperature, since the formation reaction of polysulfone generally proceeds with low limiting temperature.

Since the purpose of the present invention is to change the properties of the hydrophilic surface of any gypsum with $2H_2O$ or $0.5 H_2O$ respectively or of anhydrous gypsum, a small quantity of polsulfone is generally used if it is sufficient to change the properties of the surface of gypsum. Excess polysulfone more than required should not be applied, because it causes coloring of the gypsum-thermoplastic resin composite as final product by heating in the production process.

Therefore, it is preferable, as the process to make small amount of polysulfone adheres homogeneously on the surface of gypsum, that the polysulfone soluble to suitable solvent is selected from polysulfones, and the polysulfone solution is applied on the surface of gypsum by immersing or spraying, then the gypsum is dried.

The polysulfones soluble to suitable solvents include a series of poly(olefinsulfone), for instance, such as poly(propylenesulfone), poly(butene-1 sulfone), poly(butene-2 sulfone), poly(pentenesulfone) and poly(hexenesulfone). Poly(propylenesulfone), poly(butenesulfone) and the like, which are prepared from lower olefins, should be used with polar solvents suitably selected from a group comprising dimethylsulfoxide, chloroform, tetrahydrofuran, dioxan, acetone, liquid sulfur dioxide and the like. Poly(octenesulfone), poly(decenesulfone) and the like, which are prepared from higher class olefines, can be used with nonpolar solvents such as cyclohexane, butylacetate, toluene, xylene, ethylbenzene and the like in addition to the above mentioned polar solvents. Polysulfones which contain vinyl compound, such as styrene, vinyl chloride and the like, or allyl compound such as allyl chloride and the like, as a constituent, can also be used with solvents similar to those for the above mentioned poly(olefinsulfons).

The mixed solvent comprising suitably selected solvents from the above mentioned groups of solvents can be used. Further, an embodiment of the present invention is constituted also by the method in which gypsum is treated by sulfur dioxide, olefines, vinyl compounds, allyl compounds and these mixtures which dissolve the polysulfone obtained in the intermediate stage of polysulfone formation reaction.

The composition by the present invention including the above objects (A) and (B) can be favorably applied to usual thermoplastic resins, preferably to polyolefin. The polyolefins used in this invention include crystalline polyolefins such as polyethylene, polypropylene and the like and the copolymers, in which olefin is contained as a constituent and which have similar properties to those of crystalline polyolefins, such as ethylene-vinyl acetate copolymers, ethylene-vinyl chloride copolymer, low-degree chlorinated polyethylene and the like. The gypsum in the present invention means calcium sulfate anhydride, $CaSO_4.0.5H_2O$, $CaSO_4.2H_2O$ and the like, natural anhydrous gypsum powder or gypsum having $2H_2O$, gypsum containing trace amount of iron and other impurities which is produced as by-product in the decomposition of phosphate ore by sulfuric acid, and furthermore, gypsum produced as by-product in various desulfurization processes for crude oil or the products separated from crude oil.

In this invention, the mixing ratio of sulfur-dioxide with an olefin, a vinyl compound monomer and/or an allyl compound monomer before the copolymerization is generally about 5–95 mole %, preferably about 10–70 mole % of sulfur dioxide on a basis of the monomer mixture. A polysulfone comprising about 50 mole % of $-SO_2-$ groups is expected to form within this range of monomer ratio. The polysulfone utilized according to this invention is a resinous polymer having degree of polymerization of not less than 10. The amount of a polysulfone adhered to gypsum is generally about 0.02–10 %, preferably about 0.05–3 % by weight of the gypsum. The surface treated gypsum of this invention is blended or kneaded with a thermoplastic resin in an amount of generally about 95–5 %, preferably about 90–20 % by weight of the resulting gypsum thermoplastic resin composite.

The present invention is further explained, hereinafter, with reference to the following examples, but the invention is not limited to these examples.

EXAMPLE 1

The commercially available gypsum with $0.5H_2O$ for food additive use was dehydrated by heating at 150°C for 2 hours. The resulting gypsum with $0.5H_2O$ was charged in an autoclave with the inner volume of 200 cc, and the air in the autoclave was sufficiently replaced with gaseous ethylene, then, 20 g of commercially available liquid sulfur dioxide was loaded. Gaseous ethylene was loaded in the autoclave with the pressure of 50 kg/cm$_2$ (gauge pressure), and the content was irradiated by Co-60 $\gamma$-rays with the dose rate of $5 \times 10^4$ rad/hr for 2 hours, at room temperature (23°–25°C). After the irradiation, unreacted gas was released and the unreacted gas was entirely removed by keeping the system under reduced pressure. The reaction product was in the form of white powder of which appearance is not different from the used raw gypsum. The increase in weight of the gypsum after the above treatment was about 1%.

The gypsum, of which surface property was improved by the above treatment, was mixed with radiation polymerized polyethylene (density: 0.941, MI: 0.05) in the weight ratio of 50:50, and was blended (= kneaded) for 20 min. at 160°C at the rotating speed of roller of 30 r.p.m, using type 50 Plasticorder roller mixer, Brabender Co., West Germany. The blended material was molded into sheet with 1 mm thick, by hot pressing at 160°C. Test pieces shaped in JIS (Japan Industrial Standards) No. 3 dumbbell were stamped out from the above sheet which has slight tinge of yellow and has appearance similar to that of opaque polyethylene sheet, and tensile test was carried out. The result is shown in Table 1. The tensile speed rate is 20 mm/min in all examples.

TABLE 1

The characteristics of the composite comprising gypsum with $0.5H_2O$, of which surface was treated with poly(ethylene-sulfone), and radiation polymerized polyethylene,
That is, by treating surface of gypsum according to the present invention, it is obviously shown that the characteristics of the composite comprising radiation polymerized polyethylene-gypsum with $0.5H_2O$ was improved.

|  | Stress at yielding point (tensile strength) (kg/cm$^2$) | Elongation at breaking point (%) |
|---|---|---|
| radiation polymerized polyethylene - surface treated gypsum with $0.5H_2O$ | 240 | 18 |
| radiation polymerized polyethylene - gypsum with $0.5H_2O$ | 220 | 12 |

EXAMPLE 2

The same gypsum as that used in Example 1 was charged in an autoclave with the inner volume of 200 cc and the air in the autoclave was sufficiently replaced with butene-1, then, butene-1 was loaded with the pressure of 1 kg/cm$_2$ (gauge pressure) at 20°C. Then, 10 g of commercially available sulfur dioxide was loaded in the autoclave. The mixture comprising gypsum with $0.5H_2O$, butene-1 and sulfur dioxide was irradiated by Co-60 $\gamma$-ray with the dose rate of $5 \times 10^4$ rad/hr for 0.5 hour at room temperature (20°–22°C). Unreacted gas was entirely removed by method similar to that in Example 1 after the irradiation was completed, and the reaction product comprising white powder was obtained, of which appearance is not different form the raw gypsum. The increase in weight of the gypsum after the above treatment was scarcely observed. The gypsum, of which surface property was improved by the above treatment, was mixed with commercially available low density polyethylene pellets in the weight ratio of 50:50, and was blended under the same conditions as those in Example 1, and the blended material was molded into a sheet. The test pieces shaped in JIS No. 3 dumbbell were stamped out from the above sheet and tensile test was carried out. The result is shown in Table 2.

TABLE 2

The characteristics of the composite comprising gypsum with $0.5H_2O$, of which surface was treated with poly(butenesulfone), and low density polyethylene.

|  | Stress at yielding point (kg/cm$^2$) | Elongation at breaking point (%) |
|---|---|---|
| low density polyethylene - surface treated gypsum with $0.5H_2O$ | 141 | 44 |
| low density polyethylene - gypsum with $0.5H_2O$ | 113 | 15 |
| low density polyethylene (100%) | 99 | 830 |

From the above data, it is obviously shown that the characteristics of the composite comprising low density polyethylene-gypsum with $0.5H_2O$ was improved by treating the surface of gypsum according to the present invention.

EXAMPLE 3

The same gypsum as that used in Example 1, which was wetted by a small amount of hexene-1, was charged in a cylindrical glass vessel, with the inner volume of 200 cc, which has gas inlet and outlet at upper and lower bottoms respectively. The air in the glass vessel was sufficiently replaced with flowing commercially available sulfur dioxide gas under the atmospheric pressure. The content in the glass vessel was irradiated by $C_s$-137 $\gamma$-rays with the dose rate of $10^4$ rad/hr for 2 hours at room temperature, under flowing further sulfur dioxide gas. The system was sufficiently flushed by nitrogen gas instead of sulfur dioxide gas, after the irradiation was completed. Then, the gypsum, of which surface was treated, was taken out and the unreacted monomer was entirely removed by keeping the gypsum under reduced pressure for 20 hours. The reaction product was white powder of which appearance is not different from raw gypsum and the increase in weight after the treatment was scarcely observed (less than 0.5 percent).

The gypsum, of which surface property was improved by the above treatment, was mixed with the same low density polyethylene pellets as that used in Example 2, in the weight ratio of 50:50, and was blended under the same conditions as those in Example 1, and the blended material was molded into a sheet. The test pieces shaped in JIS No. 3 dumbbell were stamped out from the above sheet and tensile test was carried out. The result is shown in Table 3.

TABLE 3

The characteristics of the composite comprising gypsum with $0.5H_2O$, of which surface was treated with poly(hexenesulfone), and low density polyethylene.

| | Stress at yielding point (kg/cm$^2$) | Elongation at breaking point (%) |
|---|---|---|
| low density polyethylene - surface treated gypsum with $0.5H_2O$ | 137 | 33 |

From the above table, it is obviously shown that the characteristics of the composite comprising low density polyethylene — gypsum with $0.5H_2O$ was improved by treating the surface of gypsum according to the present invention.

EXAMPLE 4

The same gypsum as that used in Example 1, was loaded in a glass ampoule with the inner volume of 100 cc, and a mixture comprising equivalent moles of octene-1 and sulfur dioxide was added into the ampoule. The ampoule was sealed after it was sufficiently evacuated, then, it was irradiated by Co-60 γ-rays with the dose rate of $10^5$ rad/hr for 1 hour at room temperature (23°–25°C). After the irradiation was completed, the glass ampoule was cooled and opened, and followed by the removal of unreacted monomer.

The reaction product was a mixture of gypsum with poly(octenesulfone) and was in the form of blocks. A solvent, tetrahydrofuran, was added to the product to dissolve and remove polymers at room temperature, and then the final product was dried. The gypsum treated was brawnish colored powder. The increase in weight after the treatment was about 8%.

The gypsum, of which surface property was improved by the above treatment, was mixed with the same low density polyethylene pellets as that used in Example 2, in the weight ratio of 50:50, and was blended under the same conditions as those in Example 1, and the blended material was molded into a sheet. The test pieces shaped in JIS No. 3 dumbbell were stamped out from the above sheet and tensile test was carried out. The result is shown in Table 4.

TABLE 4

The characteristics of the composite comprising gypsum with $0.5H_2O$, of which surface was treated with poly(octenesulfone), and low density polyethylene.

| | Stress at yielding point (kg/cm$^2$) | Elongation at breaking point (%) |
|---|---|---|
| low density polyethylene - surface treated gypsum with $0.5H_2O$ | 74 | 55 |

From the above table, it is shown that the stress at yielding point was reduced by treating the surface with a large amount of poly(octenesulfone). Although not shown in the above table, it was found out that the composite was soft resin which show the property like rubber.

EXAMPLE 5

The gypsum for food additive use used in Example 1 was used, as it has $2H_2O$ for crystallization, without dehydration by heating. The above gypsum was treated using butene-1 and sulfur dioxide under the same conditions as those in Example 2, except for that the reaction was carried out at 0°C. The increase in weight after the reaction was 0.5%.

The gypsum with $2H_2O$, of which surface property was improved by the above treatment, was mixed with commercially available high density polyethylene pellets in the weight ratio of 50:50, and was blended under the same conditions as those in Example 1, and the blended material was molded into a sheet. The test pieces shaped in JIS No. 3 dumbbell were stamped out from the above sheet and tensile test was carried out. The result was shown in Table 5.

TABLE 5

The characteristics of the composite comprising gypsum with $2H_2O$, of which surface was treated with poly(butenesulfone), and commercially available high density polyethylene.

| | Stress at yielding point (kg/cm$^2$) | Elongation at breaking point (%) |
|---|---|---|
| high density polyethylene - surface treated gypsum with $2H_2O$ | 238 | 7.6 |

EXAMPLE 6

The gypsum of which surface was treated by the same poly(butenesulfone) as that used in Example 2 was used, and commercially available polypropylene was used as thermoplastic resin for mixing with the gypsum.

A mixture, comprising above mentioned materials in the weight ratio of 50:50, was blended for 7 minutes at 190°C by type 50 roller mixer as well as in Example 1, with the rotating speed of the roller of 30 r.p.m. The blended material was molded into a sheet by hot press. The test pieces shaped in JIS No. 3 dumbbell were stamped out from the light brawnish opaque sheet obtained in the above process, and tensile test was carried out. The result is shown in Table 6.

TABLE 6

The characteristics of the composite comprising gypsum with $0.5H_2O$, of which surface was treated with poly(butenesulfone), and commercially available polypropylene.

|  | Stress at yielding point (kg/cm$^2$) | Elongation at breaking point (%) |
|---|---|---|
| polypropylene - surface treated gypsum with $0.5H_2O$ | 223 | 4.9 |

EXAMPLE 7

Commercially available gypsum with $0.5H_2O$ (extra pure reagent grade) was loaded in the same glass vessel as that used in Example 3, and sulfur dioxide gas was flowed through the vessel, for 10 minutes at −5°C under atmospheric pressure. After above process, the flow of sulfur dioxide gas was switched to the flow of propylene and simultaneously the temperature was lowered down to −30°C. The content in the vessel was irradiated by Co-60 γ-rays with the dose rate of $3 \times 10^5$ rad/hr for 30 minutes under a slight flow of propylene. After the irradiation, the temperature of the system was brought back to room temperature. The surface treated gypsum was taken out from the vessel and was dried under reduced pressure to remove unreacted monomer. The reaction product was white powder of which appearance is not different from raw gypsum and the increase in weight after the reaction was scarcely observed.

The gypsum, of which surface property was improved by the above treatment, was mixed with the same high density polyethylene pellets in the weight ratio of 50:50. The mixture was blended under the same conditions as those in Example 1, then, was molded into a sheet. The test pieces shaped in JIS No. 3 dumbbell were stamped out from the above sheet and tensile test was carried out. The result was shown in Table 7.

TABLE 7

The characteristics of the composite comprising gypsum with $0.5H_2O$, of which surface was treated with poly(propylenesulfone), and commercially available high density polyethylene.

|  | Stress at yielding point (kg/cm$^2$) | Elongation at breaking point (%) |
|---|---|---|
| high density polyethylene - surface treated gypsum with $0.5H_2O$ | 242 | 5.9 |

EXAMPLE 8

The same gypsum with $0.5H_2O$ as that used in Example 7 was mixed with a small amount of octene-1 and the mixture was loaded in the same glass vessel as that used in Example 3. Then, the mixture was irradiated by Co-60 γ-ray with the dose rate of $10^5$ rad/hr for 30 minutes at 0°C, with flowing gas mixture comprising almost equivalent moles of commercially available sulfur dioxide and butene-2 (mixture comprising cis- and trans-compounds) through the glass vessel. After the irradiation, nitrogen gas was flowed to replace the system instead of the above gas mixture, then, the surface treated gypsum was taken out. By drying the reaction product under reduced pressure, unreacted monomer was entirely removed.

The reaction product was white powder of which appearance is not different from raw gypsum, and the increase in weight after the reaction was 1%.

The gypsum, of which surface property was improved by the above treatment, was mixed with the same low density polyethylene pellets as in Example 2 in the weight ratio of 50:50, and the mixture was blended under the same conditions as those in Example 1, then, was molded into a sheet. The test pieces shaped in JIS No. 3 dumbbell were stamped out from the above sheet and tensile test was carried out. The result is shown in Table 8.

TABLE 8

The characteristics of composite comprising gypsum with $0.5H_2O$, of which surface was treated with poly(-mixed olefin sulfone), and low density polyethylene.

| Stress at yielding point (kg/cm$^2$) | Elongation at breaking point (%) |
|---|---|
| 122 | 24 |

EXAMPLE 9

The same gypsum with $0.5H_2O$ as that used in Example 7 was dehydrated by heating for 2 hours at 300°C. The gypsum was loaded in the same autoclave as that used in Example 1. After the autoclave was evacuated, 5 g of commercially available sulfur dioxide was loaded. A mixture of n-hexane and hexene-1 in the mole ratio of 10:1 was further loaded. The mixture, comprising gypsum anhydride, sulfur dioxide, hexene-1 and hexane, was irradiated by Co-60 γ-rays with the dose rate of $10^5$ rad/hr for 1 hour at room temperature (20° − 22°C). After the irradiation, unreacted monomer and n-hexane used as solvent was entirely removed by drying the surface treated gypsum under reduced pressure. The reaction product was white powder of which appearance is not different from the raw gypsum and the increase in weight after the reaction was about 1%.

The gypsum, of which surface property was improved by the above treatment, has a low tendency to be aggregated and can easily be handled. The reaction product was mixed with the same commercially available low density polyethylene pellets as that used in Example 2 in the weight ratio of 50:50, and the mixture was blended for 15 minutes at 160°C, using a roller, with 101.6 mm dia and 254 mm long, with the rotating speeds of 18 and 15 r.p.m. The composite obtained was molded into a sheet with 1 mm thick by hot press at 160°C. The test pieces shaped in JIS No. 3 dumbbell were stamped out from the above sheet and tensile test was carried out. The result is shown in Table 9.

TABLE 9

The characteristics of the composite comprising gypsum anhydride, of which surface was treated with poly(hexenesulfone) in the presence of poor solvent, and low density polyethylene.

| Stress at yielding point (kg/cm$^2$) | Elongation at breaking point (%) |
|---|---|
| 118 | 29.3 |

EXAMPLE 10

The gypsum with 2H$_2$O for food addition use was dehydrated to form gypsum with 0.5H$_2$O by heating at 200°C for 3 hours. 50 g of the dehydrated gypsum and 250 mg of crystalline azobisisobutyronitrile were loaded in an autoclave with the inner volume of 200 cc. The system was cooled in dry ice-methanol bath after it was sufficiently flushed by butene-1, and about 20 g of sulfur dioxide and about 20 g of butene-1 were further loaded, then, the system was warmed in a water bath at room temperature. The autoclave was kept at 50°C for 8 hours by immersing in warm bath, then, the interval pressure was released.

The reaction product obtained was white powder of which appearance is not so different from raw gypsum.

The gypsum, of which surface property was improved by the above treatment, was mixed with commercially available low density polyethylene in the weight ratio of 50:50, and was blended for 10 minutes at 160°C with the rotating speed of 30 r.p.m. using a type 50 Plasticorder roller mixer, Brabender Co., West Germany. The blended material was molded into a sheet with 1 mm thick by hot press at 160°C. The test pieces shaped in JIS No. 3 dumbbell were stamped out from the sheet of which appearance is similar to that of opaque polyethylene, and tensile test was carried out. The result is shown in Table 10.

TABLE 10

The characteristics of the composite comprising gypsum with 0.5H$_2$O, of which surface was treated with poly(butenesulfone) polymerized by the use of radical initiator, and low density polyethylene.

| Stress at yielding point (kg/cm$^2$) | Elongation at breaking point (%) |
|---|---|
| 138 | 35 |

From the above table, it is obviously shown that the characteristics of the composite, comprising low density polyethylene - gypsum with 0.5H$_2$O, was improved by treating the surface of gypsum according to the present invention.

EXAMPLE 11

A mixture comprising equivalent moles of hexene-1 and sulfur dioxide was loaded in a glass ampoule, and the ampoule was sealed after it was evacuated. The ampoule was irradiated by Co-60 γ-rays with the dose rate of 4 × 10$^4$ rad/hr for 4 hours to obtain poly(hexenesulfone). 1.0 g of the poly(hexene-sulfone) was dissolved in 100 cc of acetone. The poly(hexene-sulfone) solution was added to 200 g of gypsum with 0.5H$_2$O which had been prepared by heating gypsum with 2H$_2$O for food addition use, at 150°C for 2 hours, and both materials were well mixed. After the mixture was dried at 100°C, white powder was obtained.

The gypsum, of which surface property was improved by the above treatment, was mixed with commercially available low density polyethylene in the weight ratio of 50:50, and was blended for 10 minutes at 160°C with the rotating speed of 30 r.p.m., using a type 50 Plasticorder roller mixer, Brabender Co., West Germany. The blended material was molded into a sheet with 1 mm thick by hot press at 160°C. The test pieces shaped in JIS No. 3 dumbbell were stamped out from the resulting opaque sheet which has slight tinge of yellow, and tensile test was carried out. The tensile speed rate used was 20 mm/min in all examples. The result is shown in Table 11, together with the result on the gypsum which was not treated by poly(hexenesulfone) for comparison.

TABLE 11

The mechanical properties of the composite comprising gypsum with 0.5H$_2$O, of which surface was treated with poly(hexenesulfone), and low density polyethylene. (ratio of low density polyethylene to the composite: 50 weight %)

| | Stress at yielding point (kg/cm$^2$) | Elongation at breaking point (%) |
|---|---|---|
| surface treated gypsum | 120.5 | 21.2 |
| untreated gypsum | 112.6 | 15.1 |

From the above table, it is obviously shown that the characteristics of the composite comprising gypsum-polyethylene was improved by the use of gypsum treated with poly(hexenesulfone).

EXAMPLE 12

An autoclave, with the inner volume of 200 cc, was cooled after evacuation, 3l of butene-1 (at 20°C and 1 atm) and 50l of sulfur dioxide (at 20°C and 1 atm) were liquified and loaded. After the autoclave was further cooled at lower temperature and evacuated, it was irradiated by Co-60 γ-rays with the dose rate of 10$^4$ rad/hr for 16 hours. After the irradiation, the autoclave was opened in a draft chamber, and 100 g of gypsum with 0.5H$_2$O, which had been prepared by dehydrating gypsum with 2H$_2$O for food addition use at 150°C for 2 hours and had been kept at about −20°C by adding liquid nitrogen little by little, was gradually added into the autoclave with stirring. The resulting mixture was left in the draft chamber for 3 hours in order to make unreacted butene-1 excess sulfur dioxide evaporate, which was contained as a solvent for poly(butenesulfone). The gypsum in the autoclave, of which surface was treated with poly(butenesulfone), was further degassed under reduced pressure.

The surface treated gypsum, which was prepared by the above process, was white powder. The gypsum was mixed with commercially available high density polyethylene in the weight ratio of 50:50, and was blended for 10 minutes at 160°C with the rotating speed of 30 r.p.m., using a type 50 Plasticorder roller mixer, Brabender Co., West Germany. The blended material was molded into a sheet with 1 mm thick by hot press at 160°C. The test pieces shaped in JIS No. 3 dumbbell were stamped out from the resulting opaque sheet which has slight tinge of yellow, and tensile test was carried out. The result is shown in Table 12, together with the result on the gypsum which was not treated by poly(butenesulfone) for comparison.

From the table, it is obviously shown that the characteristics of the composite comprising gypsum-polyethylene was improved by the use of gypsum treated with poly(Butenesulfone).

TABLE 12

The mechanical properties of the composite comprising gypsum with 0.5H$_2$O of which surface was treated with poly(butenesulfone), and high density polyethylene. (ratio of high density polyethylene to the composite: 50 weight %)

|  | Stress at yielding point (kg/cm$^2$) | Elongation at breaking point (%) |
| --- | --- | --- |
| surface treated gypsum | 22.0 | 10.9 |
| untreated gypsum | 20.5 | 4.7 |

EXAMPLE 13

A gas mixture, comprising equivalent moles of allyl chloride and sulfur dioxide, was loaded in a glass ampoule, and the ampoule was sealed after evacuation. The ampoule was irradiated by Cs-137 γ-rays with the dose rate of 10$^4$ rad/hr for 8 hours. 1 g of poly(allylchloridesulfone), which was resulted from the above reaction, was dissolved in 100 cc of acetone. 200 g of gypsum for food addition use was added to the above poly(allylchloridesulfone) solution, and was dried at 100°C after the mixture was sufficiently mixed. The resulting product obtained was powder of which properties were similar to that of raw gypsum. The surface treated gypsum by the above process was mixed with commercially available low density polyethylene pellets in the weight ratio of 50:50, and was blended under the same conditions as those in Example 11. The blended material was molded into a sheet and the test pieces shaped in JIS No. 3 dumbbell were stamped out. Tensile test was carried out and the result was shown in Table 13.

TABLE 13

The characteristics of the composite comprising surface treated gypsum with poly(allylchloridesulfone), and low density polyethylene.

| Stress at yielding point (kg/cm$^2$) | Elongation at breaking point (%) |
| --- | --- |
| 118 | 27 |

EXAMPLE 14

A mixture, comprising equivalent moles of octene-1 and sulfur dioxide, was loaded in a glass ampoule, and the ampoule was sealed after evacuation. The above ampoule was irradiated by Co-60 γ-rays with the dose rate of 4 × 10$^4$ rad/hr for 4 hours at room temperature (20°-22°C). 0.5 g, 1 g, 2 g and 5 g of poly(octenesulfone), which was resulted from the above reaction, were dissolved in 100 g each of cyclohexane, respectively. Each 200 g of gypsum anhydride, which was prepared by heating gypsum with 2H$_2$O for food addition use at 250°C for 2 hours, was added to above poly(octenesulfone) solutions respectively, and the mixtures were dried at 100°C after the mixtures were sufficiently mixed up. The color of produced powder tended to change from white to light yellow and the powder tended to aggregate, as the quantity of poly(octenesulfone) added was increased. The gypsum, of which surface was treated by the above process, was mixed with commercially available low density polyethylene in the weight ratio of 50:50, and the mixture was blended for 15 minutes at 160°C with the rotating speeds of 18 r.p.m. and 15 r.p.m. using rollers with 101.6 mm dia. and 254 mm long. The composite obtained was molded into a sheet with 1 mm thick by hot press at 160°C. The test pieces shaped in JIS No. 3 dumbbell were stamped out from the sheets colored in the range from light yellow to light brown, and tensile test was carried out. The result is shown in Table 14.

From Table 14, it is obviously shown that the characterisitics of the composite comprising gypsum-polyethylene was improved by the use of gypsum treated by poly(octenesulfone).

TABLE 14

The mechanical properties of the composite comprising gypsum with 0.5H$_2$O treated with poly(octenesulfone), and low density polyethylene. (ratio of low density polyethylene to the composite: 50 weight %)

| Poly(octenesulfone) (g) | Stress at yielding point (kg/cm$^2$) | Elongation at breaking point (%) |
| --- | --- | --- |
| 0 | 112.6 | 15.1 |
| 0.5 | 120.1 | 28.5 |
| 1 | 114.9 | 23.1 |
| 2 | 106.0 | 23.9 |
| 5 | 88.1 | 27.4 |

EXAMPLE 15

A mixture of equivalent moles of octene-1 and sulfur dioxide, with addition of 0.01 mole % of silver nitrate, was loaded in a glass ampoule under cooling, and the ampoule was sealed after evacuation. The ampoule was opened after it was kept for 5 hours at room temperature (20°-22°C), and the content was dissolved in acetone. The solution was poured into a large amount of water and poly(octenesulfone) was obtained as precipitates. Using 1.0 g of dried poly(octenesulfone), the surface treated gypsum with $0.5H_2O$ was produced by the same process as that in Example 11.

The gypsum of which surface was treated with the above process was mixed with commercially available low density polyethylene in the weight ratio of 50:50, and an opaque sheet with 1 mm thick, which has slight tinge of yellowish brown, was obtained by treating the gypsum through a similar process to that in Example 11. The test pieces shaped in JIS No. 3 dumbbell were stamped out from the above sheet and tensile test was carried out. The result is shown in Table 15.

TABLE 15

The characteristics of the composite comprising the gypsum with $0.5H_2O$ treated by poly(octenesulfone) formed in catalytic reaction, and low density polyethylene.

| Stress at yielding point (kg/cm$^2$) | Elongation at breaking point (%) |
|---|---|
| 119.1 | 23.2 |

What we claim is:

1. A method of imparting properties suitable for preparing a gypsum - thermoplastic resin composite to a gypsum powder, comprising adhering a polysulfone resin to the surface of each particle of said powder, said polysulfone resin being a polymer having $-SO_2-$ groups in the main polymeric chain thereof and being a reaction product of $SO_2$ and a monomer selected from the group consisting of olefins of 2-12 carbon atoms, styrene, vinyl chloride, allyl chloride, and combinations thereof.

2. A method in accordance with claim 1, in which said polysulfone resin is adhered to the surface of the gypsum by copolymerizing sulfur dioxide and said monomer on the surface of the gypsum powder.

3. A method in accordance with claim 1, in which said polysulfone resin is adhered to the surface of the gypsum by treating the surface of the gypsum powder with a solution of said polysulfone resin.

4. A method in accordance with claim 1, in which said polysulfone resin is adhered to the surface of the gypsum by treating the surface of the gypsum powder with a solution of said polysulfone resin in at least one unreacted monomer selected from an olefin, a vinyl monomer, an allyl compound monomer and sulfur dioxide.

5. A method in accordance with claim 1, in which said monomer is an olefin monomer having 2-12 carbon atoms.

6. A method in accordance with claim 5 in which said olefin is an α-olefin having from 2-8 carbon atoms.

7. A gypsum composition having increased affinity for thermoplastic resins, which can be used for preparing a gypsum-thermoplastic resin composite, comprising a gypsum powder and a polysulfone resin adhered to the surface of each particle of said powder, said polysulfone resin being a polymer having $-SO_2-$ groups in the main polymeric chain thereof and being a reaction product of $SO_2$ and a monomer selected from the group consisting of olefins of 2-12 carbon atoms, styrene, vinyl chloride, allyl chloride, and combinations thereof.

8. A gypsum composition in accordance with claim 7 in which said monomer is an olefin monomer having 2-12 carbon atoms.

9. A gypsum composition in accordance with claim 8 in which said olefin is an α-olefin having from 2-8 carbon atoms.

10. A gypsum-thermoplastic resin composite comprising a mixture of a gypsum composition in accordance with claim 7 and a polyolefin said polyolefin being present in an amount of 95-5% by weight gypsum in the resultant composite.

11. A method of producing the gypsum-thermoplastic resin composite of claim 10 comprising blending said gypsum with said polyolefin in an amount of 95-5% by weight gypsum in the resulting composite.

* * * * *